(12) United States Patent
Ishii

(10) Patent No.: US 8,699,342 B2
(45) Date of Patent: Apr. 15, 2014

(54) TRANSMISSION DEVICE

(75) Inventor: Yusuke Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1225 days.

(21) Appl. No.: 11/896,907

(22) Filed: Sep. 6, 2007

(65) Prior Publication Data
US 2008/0291924 A1    Nov. 27, 2008

(30) Foreign Application Priority Data

Sep. 7, 2006  (JP) .................................. 2006-242779

(51) Int. Cl.
*G08C 15/00*    (2006.01)
(52) U.S. Cl.
USPC ............................ 370/235; 370/255; 370/400
(58) Field of Classification Search
None
See application file for complete search history.

(56) References Cited

U.S. PATENT DOCUMENTS

| 6,026,077 | A | * | 2/2000 | Iwata ............................ 370/254 |
| 6,421,321 | B1 | * | 7/2002 | Sakagawa et al. ......... 370/238.1 |
| 7,340,169 | B2 | * | 3/2008 | Ovadia et al. .................... 398/57 |
| 2002/0138645 | A1 | * | 9/2002 | Shinomiya et al. ........... 709/238 |
| 2002/0172149 | A1 | * | 11/2002 | Kinoshita et al. ............. 370/216 |
| 2003/0005148 | A1 | * | 1/2003 | Mochizuki et al. ........... 709/238 |
| 2003/0161304 | A1 | * | 8/2003 | deBoer et al. ................. 370/386 |
| 2006/0037075 | A1 | * | 2/2006 | Frattura et al. .................. 726/22 |

FOREIGN PATENT DOCUMENTS

JP     2004-179759     6/2004

\* cited by examiner

*Primary Examiner* — Gregory Sefcheck
*Assistant Examiner* — Daniel Mitchell
(74) *Attorney, Agent, or Firm* — Staas & Halsey LLP

(57) ABSTRACT

According to an aspect of an embodiment, a transmission device, that automatically generates transmission paths within a transmission network, includes a storing unit that stores first information that indicates an end user to which a link, where a transmission path is contained, and a path bandwidth, which is used to generate the transmission path, are assigned and second information that indicates whether the path can be shared each of the end users; and a sending unit sending third information to identify the end user and the second information to a adjacent node.

9 Claims, 16 Drawing Sheets

FIG.6

| LINK IDENTIFIER 60 | END USER IDENTIFIER 61 | LABEL NUMBER 62 | BANDWIDTH 63 | SHARABILITY 64 | NUMBER OF SHARES 65 |
|---|---|---|---|---|---|
| 1 | A | 1-1 | 50 Mbps | SHARABLE | 1 |
| 1 | A | 2-1 | 50 Mbps | NOT SHARABLE | 0 |
| 2 | B | 1-4 | 150 Mbps | SHARABLE | 1 |

FIG.8

| LINK IDENTIFIER 80 | END USER IDENTIFIER 81 | MAXIMUM BANDWIDTH 82 | WARNING THRESHOLD VALUE 83 |
|---|---|---|---|
| 1 | A | 150 Mbps | 70% |
| 1 | B | 150 Mbps | 80% |
| 2 | B | 600 Mbps | 70% |

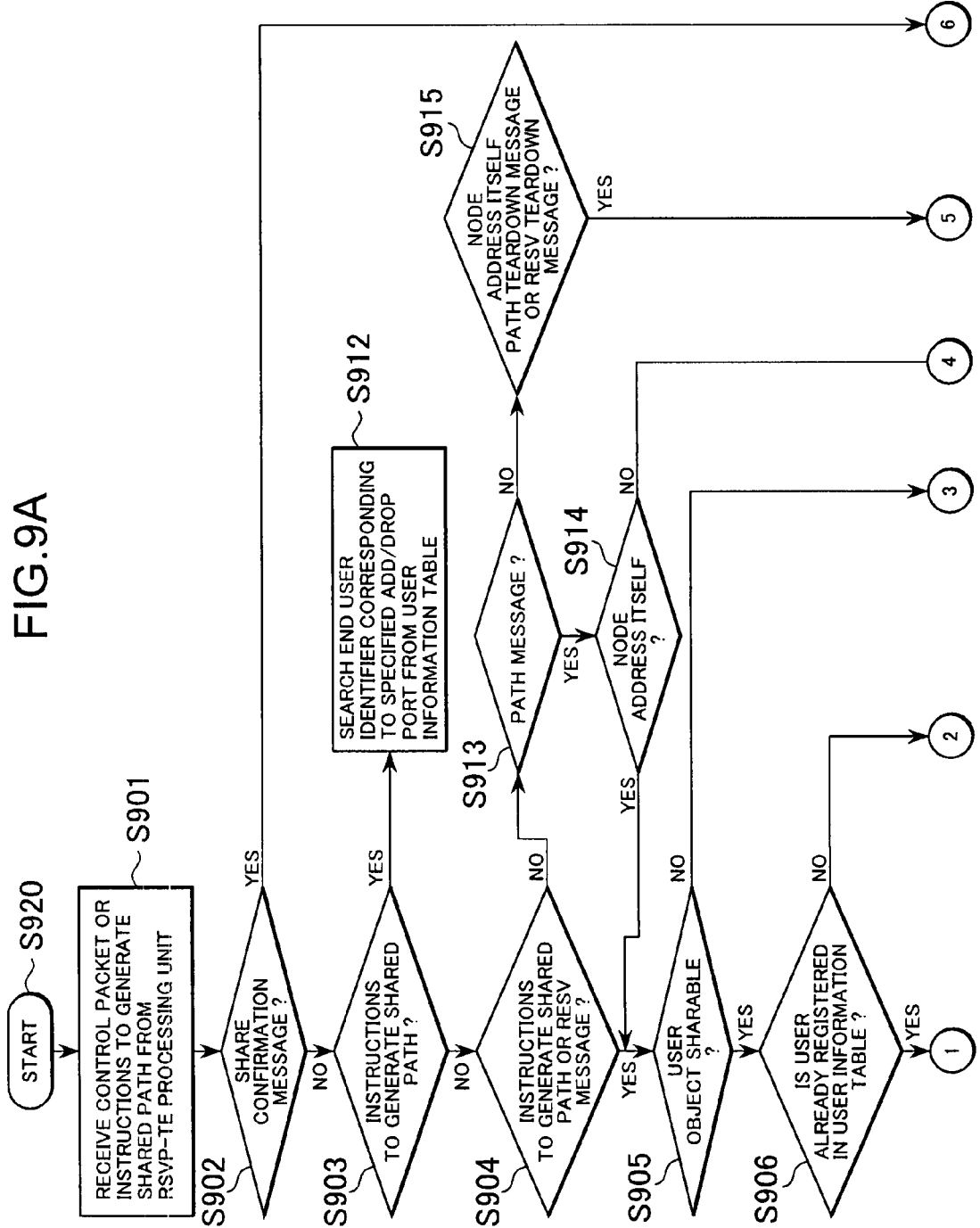

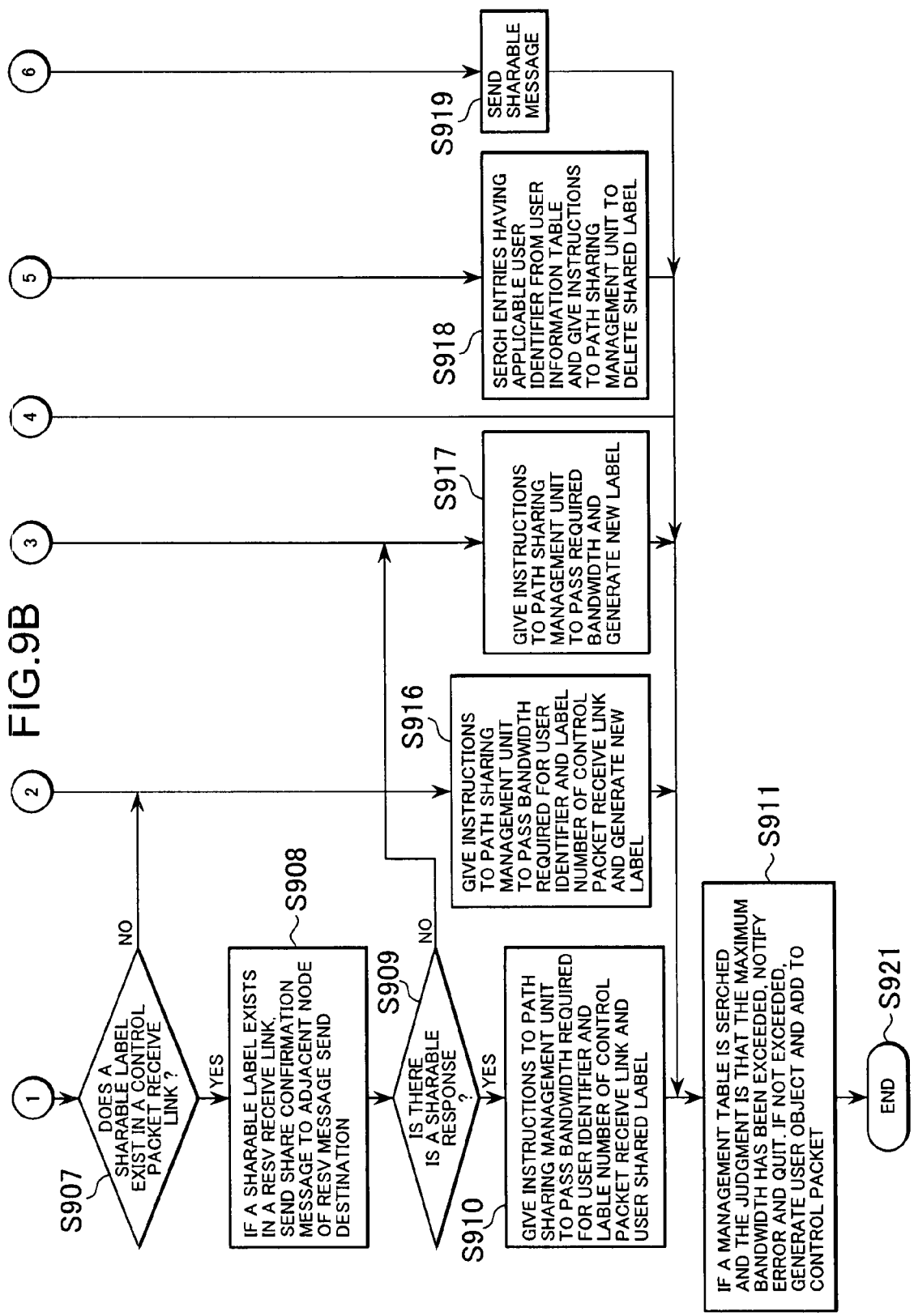

FIG.12

NODE #2 _121_

| LINK IDENTIFIER | END USER IDENTIFIER | SHARED LABEL NUMBER | BANDWIDTH | SHARABILITY | NUMBER OF SHARES |
|---|---|---|---|---|---|
| 1 | A | 1-1 | 50 Mbps | SHARABLE | 1 |
| 2 | A | 1-2 | 50 Mbps | SHARABLE | 1 |
| 2 | B | - | 150 Mbps | SHARABLE | 1 |

_122_ _123_ _124_ _125_ _126_

NODE #3 _127_

| LINK IDENTIFIER | END USER IDENTIFIER | SHARED LABEL NUMBER | BANDWIDTH | SHARABILITY | NUMBER OF SHARES |
|---|---|---|---|---|---|
| 1 | A | 1-1 | 50 Mbps | SHARABLE | 1 |
| 1 | B | 1-2 | 150 Mbps | SHARABLE | 1 |
| 2 | A | 1-1 | 50 Mbps | SHARABLE | 1 |
| 2 | B | 1-2 | 150 Mbps | SHARABLE | 1 |

_128_ _129_ _130_ _131_ _132_

NODE #5 _133_

| LINK IDENTIFIER | END USER IDENTIFIER | SHARED LABEL NUMBER | BANDWIDTH | SHARABILITY | NUMBER OF SHARES |
|---|---|---|---|---|---|
| 1 | A | 1-1 | 50 Mbps | SHARABLE | 1 |
| 1 | B | 1-2 | 150 Mbps | SHARABLE | 1 |
| 2 | A | 1-1 | 50 Mbps | SHARABLE | 1 |

NODE #2

| LINK IDENTIFIER | END USER IDENTIFIER | SHARED LABEL NUMBER | BANDWIDTH | SHARABILITY | NUMBER OF SHARES |
|---|---|---|---|---|---|
| 1 | A | 1-1 | 50 Mbps | SHARABLE | 1 |
| 2 | A | 1-1 | 1 Gbps | SHARABLE | 2 |
| 2 | B | - | 150 Mbps | SHARABLE | 1 |

NODE #3

| LINK IDENTIFIER | END USER IDENTIFIER | SHARED LABEL NUMBER | BANDWIDTH | SHARABILITY | NUMBER OF SHARES |
|---|---|---|---|---|---|
| 1 | A | 1-1 | 1 Gbps | SHARABLE | 2 |
| 1 | B | 1-2 | 150 Mbps | SHARABLE | 1 |
| 2 | A | 1-1 | 1 Mbps | SHARABLE | 2 |
| 2 | B | 1-2 | 150 Mbps | SHARABLE | 1 |

NODE #5

| LINK IDENTIFIER | END USER IDENTIFIER | SHARED LABEL NUMBER | BANDWIDTH | SHARABILITY | NUMBER OF SHARES |
|---|---|---|---|---|---|
| 1 | A | 1-1 | 1 Gbps | SHARABLE | 2 |
| 1 | B | 1-2 | 150 Mbps | SHARABLE | 1 |
| 2 | A | 1-1 | 50 Mbps | SHARABLE | 1 |

TRANSMISSION DEVICE

This application is based upon and claims priority to Japanese Patent Application No. 2006-242779, filed on Sep. 7, 2006, the contents being incorporated herein by reference.

BACKGROUND OF THE INVENTION

1. Field of the Invention

The present invention relates to a transmission device equipped with Generalized Multiprotocol Label Switching (GMPLS) that allows automatic generation of transmission paths within networks, based on traffic transmission path generation instructions between any two nodes from an operator in a SONET/SDH network.

2. Description of the Related Art

At present, in order to reduce operating costs, GMPLS functions are provided in SONET/SDH transmission devices, and more and more transmission devices are equipped with extended functions, such as automatically configuring transmission paths (cross-connects) in devices, without performing manual configuration by administrators.

GMPLS in a SONET/SDH transmission device gathers adjacent information between nodes using Link Management Protocol LMP (RFC 4204), acquires network topology information using a routing protocol, such as Open Shortest First for Traffic Engineering—OSPF-TE (RFC 1850, RFC 3630), and then establishes a transmission path (cross-connect) using an arbitrary bandwidth between nodes according to a signaling protocol, such as Resource Reservation Protocol for Traffic Engineering-RSVP-TE (RFC 2205, RFC 3209, RFC 3473).

An example of an automatic setup of a transmission path will be shown. FIG. 1 shows a state in which transmission paths are generated connecting two locations by a network within a carrier network. When automatically establishing a transmission path between site α and site β of end user A in this type of network, the carrier network administrator provides instructions to generate a path for Node 1 with a bandwidth required between Node 6.

When this is done, the route for Node 1 will be calculated from the node itself to Node 6 from network topology information collected by a routing protocol.

FIG. 2 shows a state when using this route information to exchange signaling protocol control packets (using RSVP-TE in this example) from end-to-end to establish a cross-connect. The information exchanged here consists of PATH messages sent from Node 1, that received the transmission path generation instructions from the administrator, and RESV messages sent from Node 6, specified as a termination node.

The PATH messages include objects such as a session that indicates which node and port there is a link between, a PHOP (Previous HOP) that indicates which adjacent node the PATH message was sent from, a Label Request that indicates the existence of a path generation request (label request), an Explicit Route that shows the end-to-end route, a Session Attribute that shows the attributes of a session such as a connected session name, a Sender Template used to designate the node where the path generation was requested, a Sender Tspec that shows the bandwidth required for the path to be generated, and a Record Route used to record the PATH message relay route.

The PATH message relay node records each piece of this information and then transitions to a relay preparation state for a RESV message arriving later. The RESV message includes objects such as a Session that indicates which node and port there is a link between, a PHOP that indicates which adjacent node the RESV message was sent from, a Style that shows the style of the allocated bandwidth, FlowSpec that shows the bandwidth allocated to the transmission path, a Label allocated in order to generate the transmission path, and a Record used to record the RESV message relay route.

If Node 6, which received a PATH message, judges that the requested bandwidth is capable of being allocated and such operation is possible, the label for the transmission path (LSP) (for example, an object that can specify a SONET/SDH time slot) is extracted, a cross connection is established with the specified port in the requested bandwidth, and an RESV message, which includes the extracted label, is sent to adjacent Node 5 where the PATH message was sent.

Node 5, which received the RESV message, extracts the label used for the connection with Node 4, establishes a cross connection with the time slot specified by the label included in the RESV message, and then sends a RESV message to Node 4. Labels are distributed to each node between Node 1 and Node 6 by means of repeating this operation until reaching Node 1, and a transmission path is automatically generated.

When SONET/SDH performs time division multiplexing on traffic, the time slot (transmission path) that has a specified bandwidth linking two locations within the network by a point-to-point is secured, but all this bandwidth is used for the transmission of traffic between the two locations. When there is an increase in mutually communicating sites, transmission paths must be generated between each of two locations.

In contrast to this, when transmitting traffic forecast to have a statistical multiplexing effect, such as Ethernet® communication, sometimes it is preferable to share the transmission paths in order to efficiently utilize the bandwidth within the network when there is an increase in mutually communicating sites, if pre-established transmission paths exist on these routes.

In other words, this is a management technique that, for example, generates one transmission path as a backbone within the network and then shares this with multiple sites. Two types of reservation formats (styles) for sharing bandwidth are defined in RSVP-TE. If Wildcard Filtering (WF) is used from among these styles, the transmission paths can be shared (bandwidth sharing), although sharing according to WF does not distinguish the owners of the traffic being transmitted.

In other words, it is possible that different end users could share identical transmission paths. FIG. 3 shows a condition when end users who should not share are sharing paths. If a path is generated between sites γ and δ of end user B, where a transmission path already exists between sites α and β of end user A, and a WF style is indicated, the RSVP-TE will not differentiate between the end users. Because of this, the path used for end user A will form a path connection such that it is simultaneously used by end user B.

This is not a preferred situation because carriers who provide services which guaranty a certain bandwidth for each user as stated in the Service Level Agreement (SLA) contract might not be able to adhere to the SLA. In addition, if a Shared Explicit (SE) style is adopted, a Multi point-to-point connection can be specified explicitly. In other words, although it is possible to limit node groups which can share paths, this is done under the condition that the Explicit Route must be the same.

FIG. 4 shows a state in which a user transmission path desired to be shared cannot be shared. If a connection is made between sites ε and ζ of end user A, while there exists a transmission path between sites α and β of end user A and a transmission path between sites γ and δ of end user B, as the path used for end user A already exists, end user A will want to share this path. However, since the Explicit Route is different, it cannot be shared and a new path will be generated resulting in consumption of valuable network bandwidth.

SUMMARY OF THE INVENTION

According to an aspect of an embodiment, a transmission device, that automatically generates transmission paths within a transmission network, includes a storing unit that stores first information that indicates which end user a link, where a transmission path is contained, and a path bandwidth, which is used to generate the transmission path, are assigned and second information that indicates whether the path can be shared by the end users; and a sending unit that sends third information to identify the end user and the second information to an adjacent node.

BRIEF DESCRIPTION OF THE DRAWINGS

FIG. 6 shows an example of USER information table.

FIG. 8 shows an example of a bandwidth management table.

FIGS. 9A and 9B show the process flow of a USER information processing unit.

FIG. 12 is a USER information table showing USER information for describing an example of path sharing.

FIG. 14 is a USER information table showing USER information for describing an example of path sharing (after completing shared label establishment).

DETAILED DESCRIPTION OF THE PREFERRED EMBODIMENTS

Figure 1:
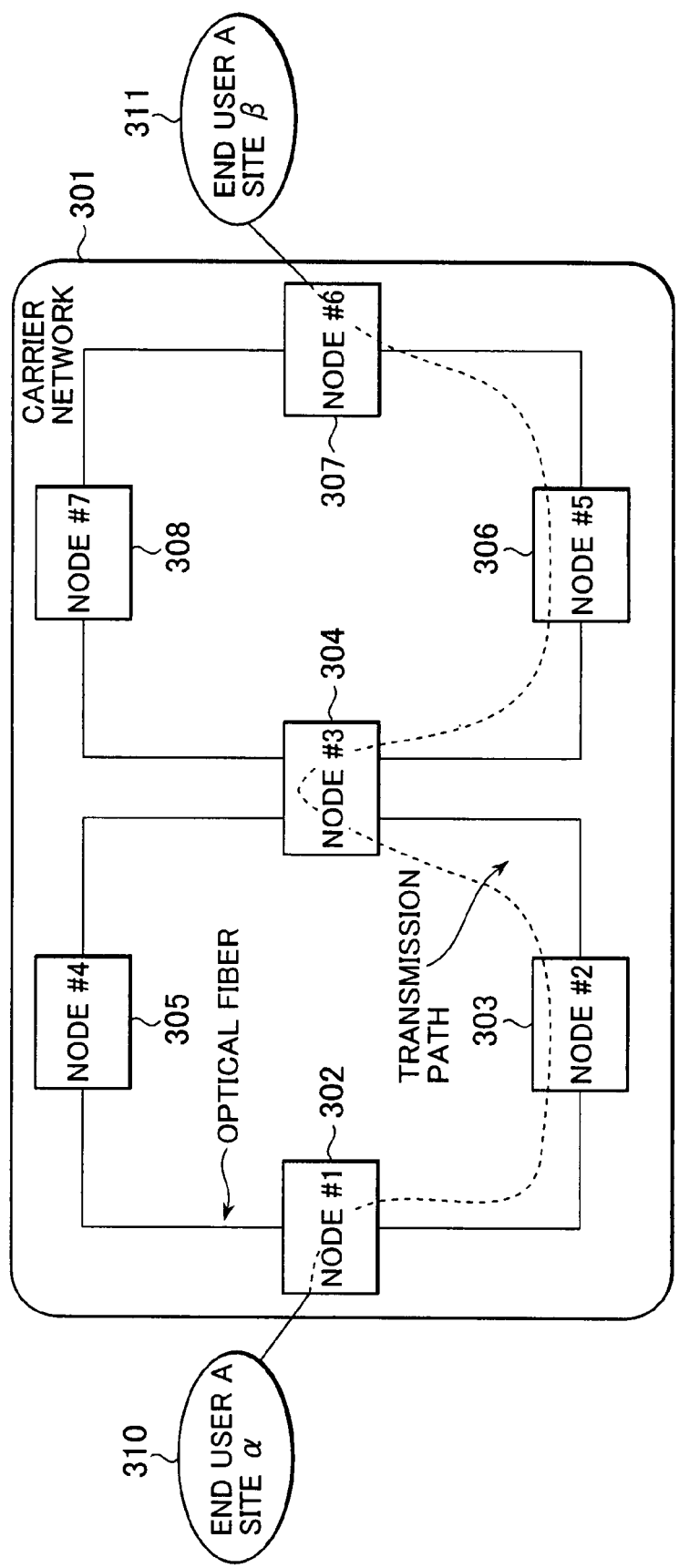
FIG. 1 shows an example when transmission paths are generated connecting two locations within a carrier network.
Figure 2:
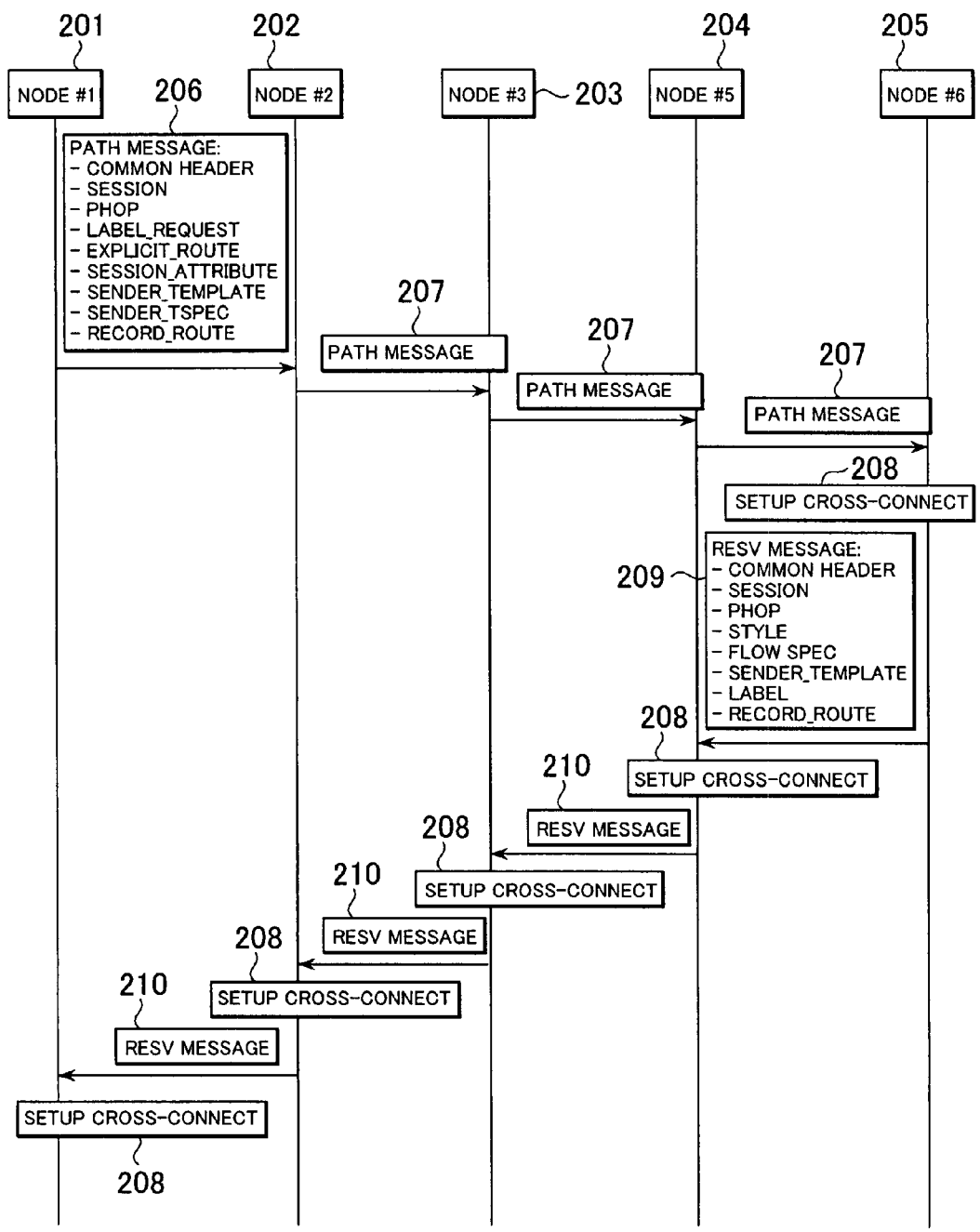
FIG. 2 shows when RSVP-TE control packets are sent and received between nodes and a cross-connect is established in order to generate the transmission path of FIG. 1.
Figure 3:
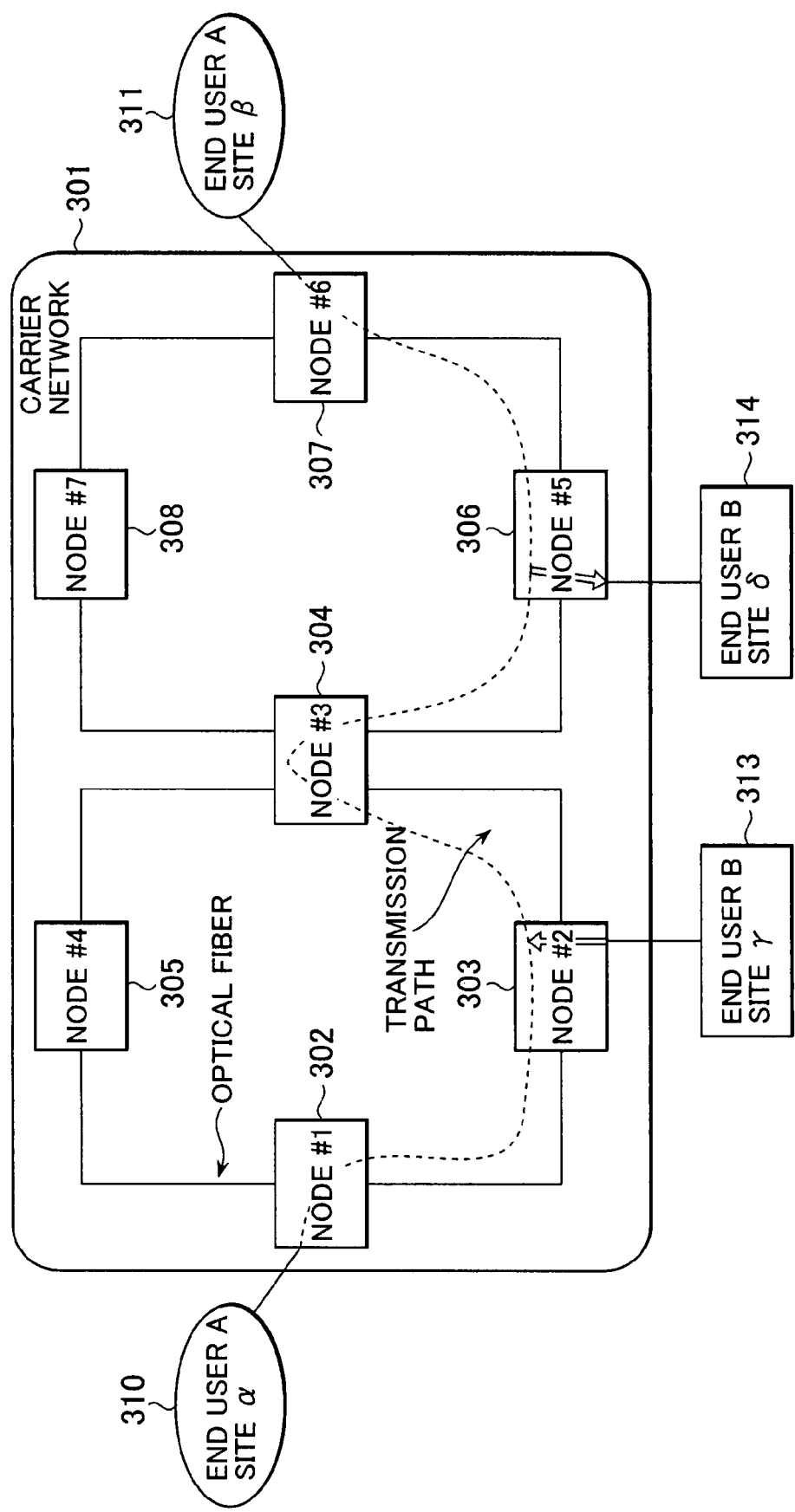
FIG. 3 shows the transmission path for end user A being shared, which should not be shared, by end user B when using a WF connection state of RSVP-TE.
Figure 4:
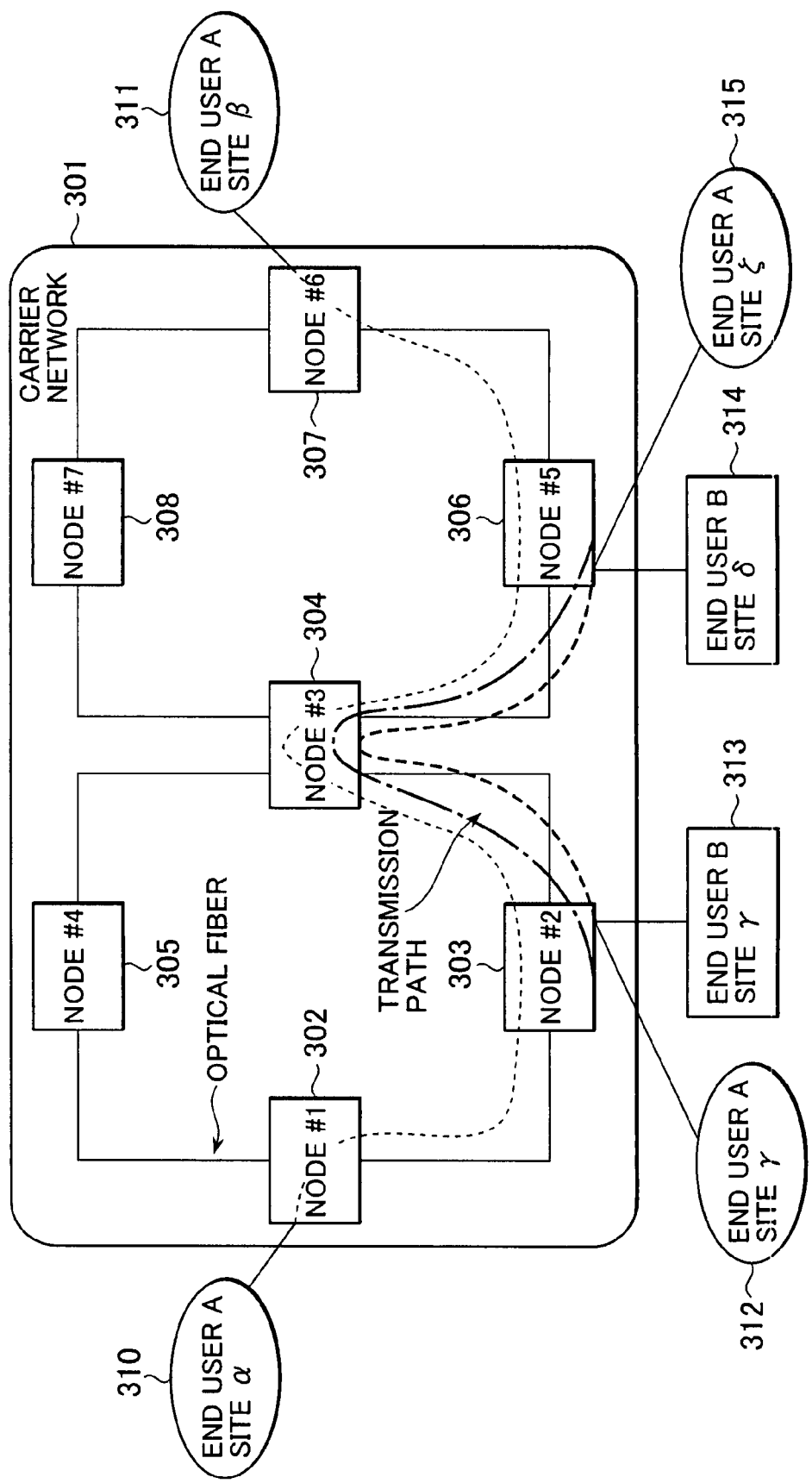
FIG. 4 shows the transmission path between sites α and β of end user A that is desired to be shared, which is not being allowed to be shared, between sites ε and ζ of the same end user A when using an SE connection state of RSVP-TE.
Figure 5:
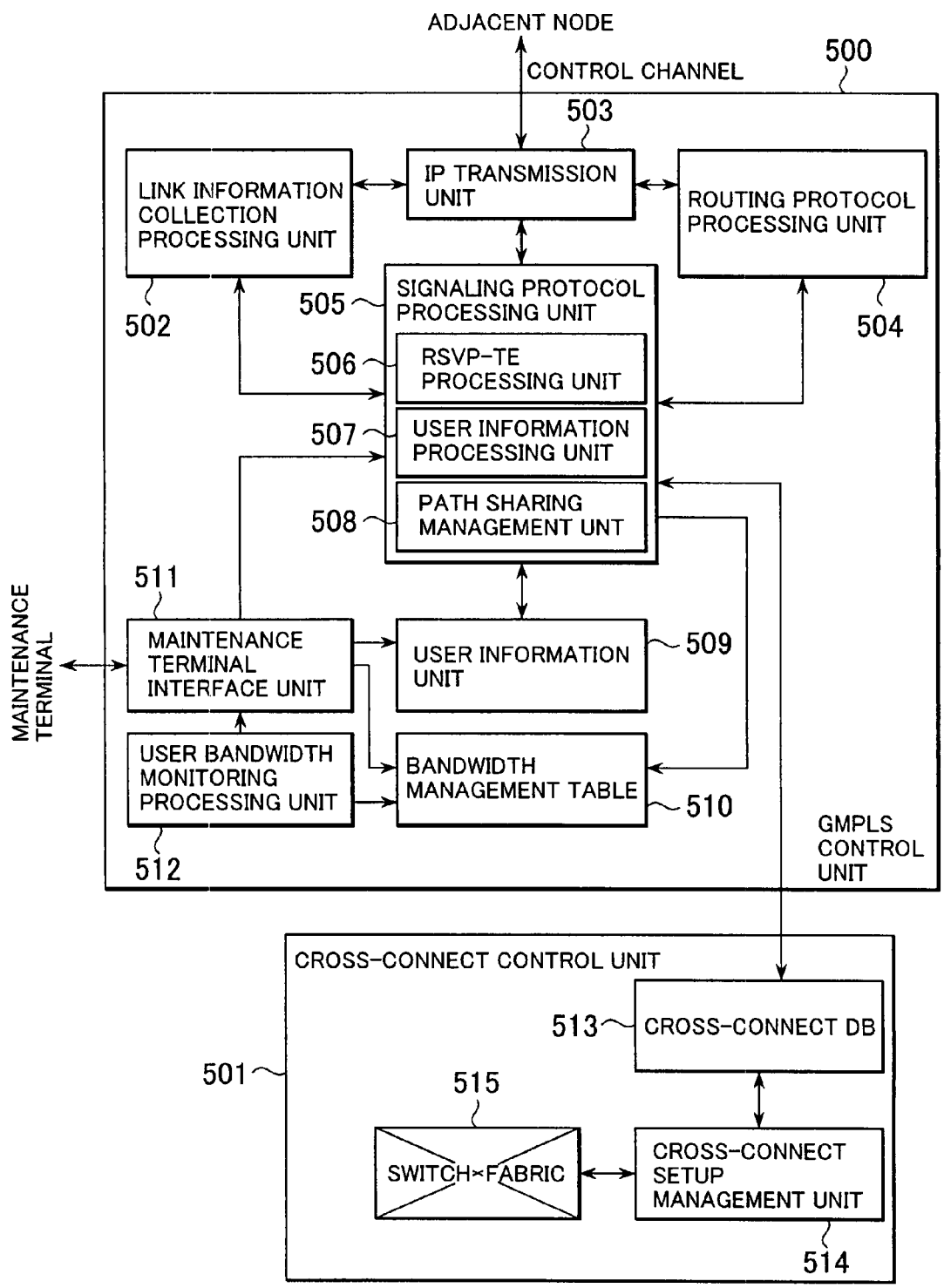
FIG. 5 shows an example of an embodiment of the present invention.

In the following, an embodiment will be described by referring to the drawings. FIG. 5 shows an embodiment. In FIG. 5 the system includes a cross-connect control unit 501 and a GMPLS control unit 500 inside the transmission device (which corresponds to a node). The cross-connect control unit 501 includes a cross-connect database (DB) 513 (nodes with available bandwidth or used bandwidth can be discovered by means of examining this DB) that functions to store cross-connect setup information, a cross-connect setup management unit 514 that searches the cross-connect DB 513 and controls a switch fabric 515, and the switch fabric 515. The GMPLS control unit 500 is connected to adjacent nodes by a control channel.

In addition, the GMPLS control unit 500 includes an IP transmission unit 503 that sends and receives control packets to adjacent nodes through the control channel, a link information collection processing unit 502 (LMP) that monitors and collects the state of links (such as optical fiber) used for connections between adjacent nodes, a routing protocol processing unit 504 (OSPF-TE) that builds network topology information, a signaling protocol processing unit 505 that executes signaling to establish and delete transmission paths, a USER information table 509 that functions to take links used to transmit traffic and label numbers used to generate transmission paths and give them correspondence with end users, a bandwidth management table 510 that shows how much bandwidth is allocated to each end user within each link within a node, a used bandwidth monitoring processing unit 512 that searches a bandwidth management table and notifies administrators of the usage state of the bandwidth (warns administrators that the remaining bandwidth that can be allocated is low), and a maintenance terminal interface unit 511 used by administrators for control, such as searching and updating USER information.

The signaling protocol processing unit 505 further includes an RSVP-TE processing unit 506 that executes conventional RSVP-TE processes and also executes instructions to generate shared paths to a USER information processing unit or instructions for RSVP-TE control message processing, a USER information processing unit 507 that processes USER objects (added to PATH/RESV/PATH TEARDOWN/RESV TEARDOWN messages of RSVP-TE) for the purpose of identifying end users of each transmission path, and a path sharing management unit 508 that searches shared paths based on the processing results of a USER information processing unit and also provides cross-connect setting instructions to the cross-connect control unit 501.

FIG. 6 shows the composition of a USER information table with entries for an end user identifier 70 and shareability 71. A USER information table has the following entries: a link identifier 60 that identifies links that contain transmission paths, an end user identifier 61 that is either set through a maintenance terminal interface or is included in the USER object added to a received RSVP-TE control packet, a label number 62 used to generate a transmission path, a bandwidth 63 allocated to a transmission path, shareability information 64 that indicates whether or not labels are sharable, and a sharing number 65 that shows how many transmission paths are sharing the applicable labels.

Figure 7:
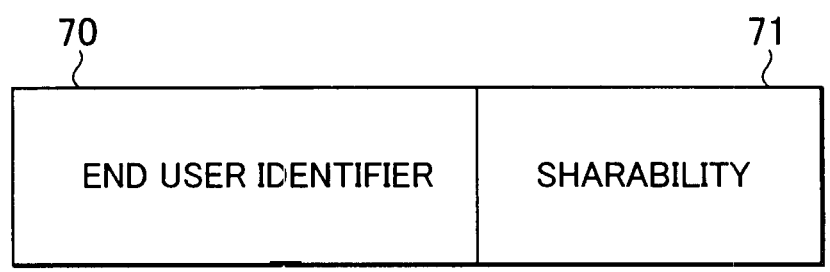
FIG. 7 shows the composition of a USER object.

FIG. 7 shows the composition of a USER object. FIG. 8 shows the composition of a bandwidth management table. A bandwidth management table has the following entries: a link identifier 80 that identifies links that contain transmission paths, an end user identifier 81 that is setup by an administrator through a maintenance terminal interface, a maximum bandwidth 82 that can be allocated to an applicable end user, and a warning threshold value 83 (judgment standard) to warn that the remaining bandwidth that can be allocated is low. The used bandwidth monitoring processing unit 512 periodically monitors the entries of the bandwidth management table 510 and then judges whether or not the warning threshold value has been exceeded for each end user with a specified maximum bandwidth. If the warning threshold value is exceeded, a warning is sent to an administrator through a maintenance terminal interface.

FIGS. 9A and 9B show the process flow of a USER information processing unit.

After the start S920, in operation S901, the USER information processing unit receives, from a RSVP-TE processing unit, shared path generation instructions as part of instructions to generate a path issued by an administrator, or receives RSVP-TE control packets received from a control channel.

In operations S902, when RSVP-TE control packets are received, a USER information processing unit judges whether or not these packets are share confirmation messages.

In operation S919, if the packets are share confirmation messages, the USER information processing unit returns the messages, with a message indicating that the path can be shared, to the adjacent nodes from which the confirmation messages were sent through the control channel that received the control packets. This share confirmation message is a message used when nodes not equipped with the embodiments discussed herein are adjacent nodes. If the bandwidth reservation style is not WF, when labels included in received RESV messages are already being used for other traffic, the nodes not equipped with the present invention will not share these labels.

For the reasons described above, it is thought that almost no carrier networks use WF. As a result of avoiding this technology, errors that occur in the signaling and transmission paths are not generated. In order to avoid this type of situation, when a message used to confirm shareability is sent to adjacent nodes before an RESV message is sent to the adjacent nodes, and a response message is not returned within a fixed time (in other words, when the adjacent nodes are not equipped with the embodiments discussed herein), the nodes equipped with the embodiments discussed herein will cancel the path sharing, generate a label used to generate a new path, and then create and send an RESV message. Consequently, even if nodes not equipped with the embodiments discussed herein exist within a network, the automatic generation of paths in a conventional system is guaranteed.

In operation S903, it is confirmed whether or not an administrator issued instructions to generate a path when there is no share confirmation message.

In operation S912, when there are instructions to generate a shared path, there is information that indicates which Add/Drop port of the node that received the generation instructions should be connected to which Add/Drop port of which node within the network, information that indicates whether or not the transmission path connecting between two ports is shared, and the bandwidth required for the transmission path. The RSVP-TE processing unit searches end-to-end route information (link information between each node for linking end points) based on instructions of an administrator and then instructs an end user identifier together with a USER information processing unit to generate a USER object.

In operation S911, the USER information processing unit that received the instructions searches the USER information table, extracts shareability information that conforms to the received end user identifier and link identifier, generates a USER object, and then adds the user object to an RSVP-TE control packet (in this case, a PATH or PATH TEARDOWN message). Then the process ends S921.

In operation S904, when a USER information processing unit receives an RSVP-TE control packet, different processes will be executed depending on the type of message. The message classifications processed by the USER information processing unit are judged to be one of the following four types: PATH, RESV, PATH TEARDOWN, or RESV TEARDOWN.

In operation S905, when an RESV message is received, it is examined to determine whether or not a USER object is included and is judged for shareability.

In operation S906, when sharing is not possible, the path sharing management unit is instructed to generate a new path to allow sharing. When sharing is possible, an end user identifier included in the USER object will be registered in a USER information table and then a check made to verify whether a sharable label exists in the link that received the RESV message.

In operation S916, if an end user identifier is not registered or a sharable label does not exist, the end user identifier and RESV message receive link are passed to a path sharing management unit and a new label is generated.

In operation S907, it is judged whether or not a registered sharable label exists.

In operation S908, if a sharable label exists and the RESV message is not addressed to the node itself, a share confirmation message will be sent to the adjacent node of the destination link of the site opposite the link (in other words, the link that sent the RESV message) that received a RESV message and then wait a fixed time for a response.

In operation S909, it is confirmed whether or not there is a sharable response.

In operation S917, if there is no response, the path sharing management unit will be instructed to generate a new label, because the adjacent node is not equipped with the embodiments discussed herein.

In operation S910, if there is a response, the end user identifier and the shared label number of the RESV message receive link are passed to the path sharing management unit and instructions are given to use the applicable label to generate a path as a shared label.

In operation S913, it is confirmed whether or not a PATH message was received.

In operation S914, it is checked whether the final destination of the PATH message is the node itself. If it is the node address itself, a process will execute identical to when a RESV message is received. If it is not the node address itself, a PATH message, appended with a USER object as is, will be sent to the link of the site opposite the link that received a PATH message. In other words, if there is no terminal node, the USER object is transferred as is. In the same manner, when a PATH TEARDOWN message is received, it is checked whether the final destination is the node itself. If it is the node address itself, a process will execute identical to when a RESV TEARDOWN message is received. If it is not the node address itself, a PATH TEARDOWN message, appended with a USER object as is, will be sent to the link of the site opposite the link that received a PATH TEARDOWN message. In other words, if there is no terminal node, the USER object is transferred as is.

In operation S915, it is confirmed whether a PATH TEARDOWN message or a RESV TEARDOWN message addressed to the node itself was received when an instruction other than any of the following is received: shared path generation instruction from the RSVP-TE processing unit, RESV message, or PATH message.

In operation S918, when a RESV TEARDOWN message is received, the end user identifier included in the USER object is located from the USER information table and an instruction is sent to the path sharing management unit to delete the path.

Figure 10A:
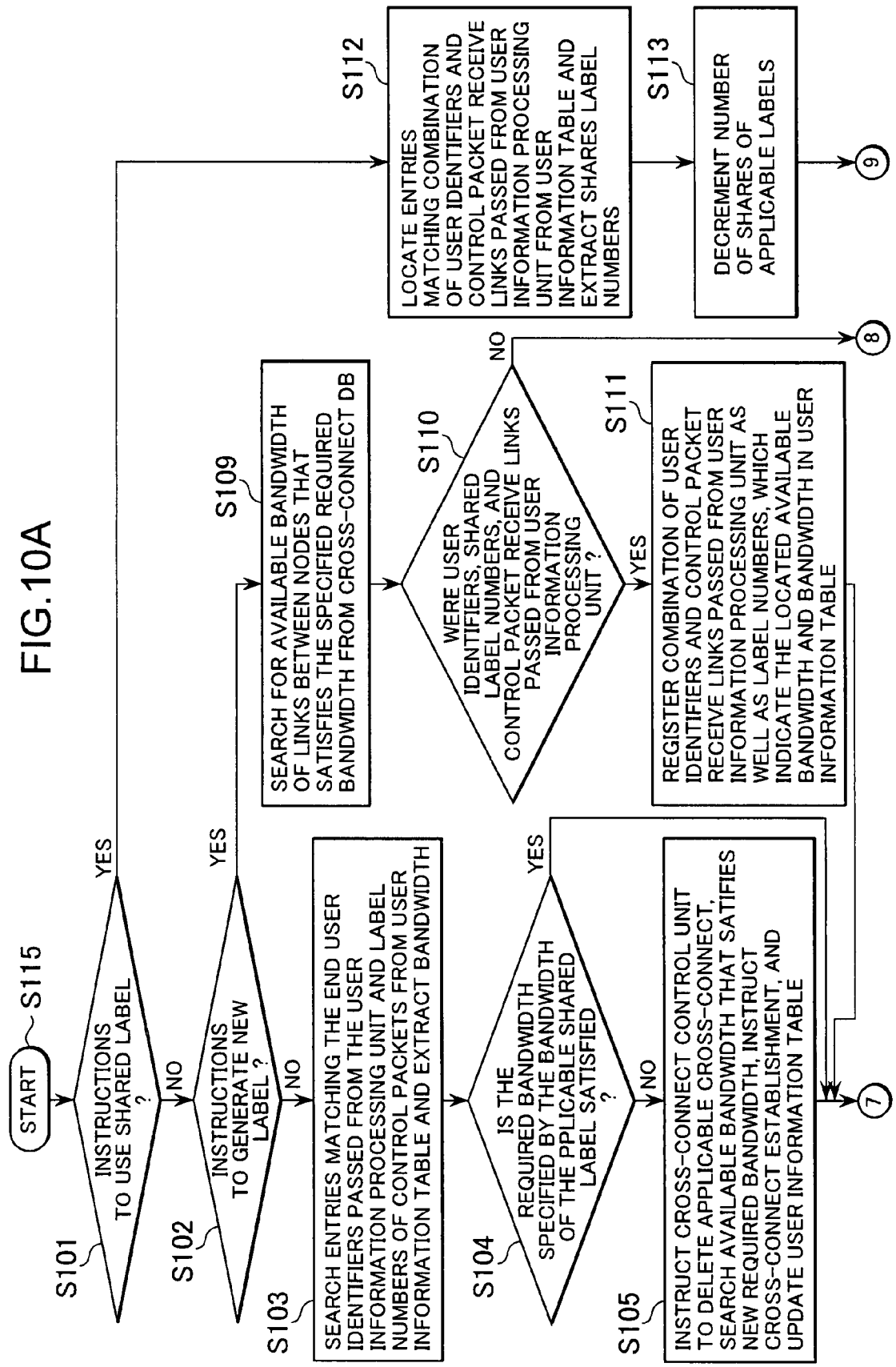
FIGS. 10A and 10B show the process flow of a path sharing management unit.
Figure 10B:
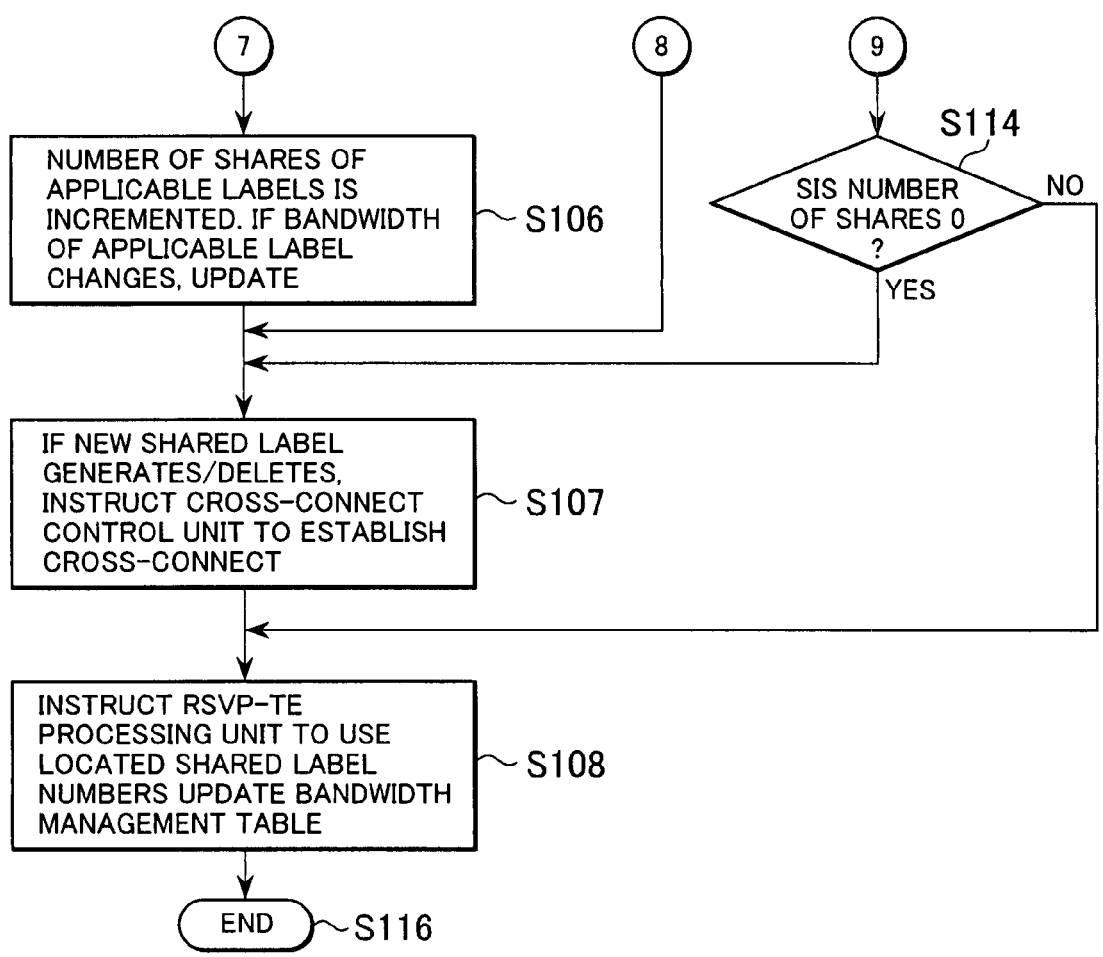

FIGS. 10A and 10B shows the operation flow of the path sharing management unit. After the start S915, in operation S101, the path sharing management unit operates by receiving instructions from the USER information processing unit.

First, the path sharing management unit judges whether the USER information processing unit instructions are using existing shared labels.

In operation S102, the USER information processing unit instructions are judged as to whether they are instructions to generate a new label.

In operation S112, if the instructions are instructions to use a shared label, there will be instructions to delete the path. Entries matching combinations of end user identifiers passed from the USER information processing unit and message receive links are located from the USER information table and the shared label numbers are extracted.

In operation S113, since the number of shares is included in the entries of the USER information table to indicate how many end users are sharing the applicable shared path, when extracting a shared label number, this number will decrement.

In operation S114, it is judged whether or not the decremented result is 0.

In operation S107, since the applicable shared labels will not be used by anyone if the number of shares is 0, the cross-connect will cancel and the entries of the USER information table will be deleted. When USER information processing unit instructions are to generate new labels or delete labels, the search results of the cross-connect DB or the search results of the USER information table are used to instruct a cross-connect control unit to establish or cancel a cross-connect.

In operation S109, if the instructions are instructions to generate a new label, the cross-connect DB will be examined and available bandwidth is searched for bandwidth that satisfies the required bandwidth of the instruction.

In operation S110, it is judged whether or not end user identifiers and RESV message receive links have been received from the USER information processing unit. If the end user identifiers and RESV message receive links have not been received, the cross-connect control unit 501 is instructed to cross connect the located available bandwidth.

In operation S111, if the end user identifiers and RESV message receive links have been received, the end user identifiers, bandwidth, and the label numbers corresponding to the located available bandwidth will be registered in the USER information table as shared label numbers of RESV message receive links.

In operation S103, if the instructions from a USER information processing unit are instructions to use existing labels, entries matching the end user identifiers received from the USER information processing unit and the shared label numbers of RESV message receive links are searched for and the bandwidth extracted.

In operation S104, it is judged whether or not the bandwidth extracted from the USER information table satisfies the required bandwidth passed from the USER information processing unit.

In operation S105, if the bandwidth is insufficient, the cross-connect control unit 501 will be instructed to delete the applicable path one time, available bandwidth (label numbers) that satisfy the required bandwidth will be searched for, the cross-connect control unit 501 is instructed to generate a new cross-connect, and the shared label numbers of the USER information table are updated. When establishing a cross-connect so as to connect an Add/Drop port, if a cross-connect already exists such that the applicable port passes through, the cross-connect control unit 501 is instructed to establish a Dual Transmit & Drop and Continue cross-connect. (In other words, a cross-connect configuration that broadcasts added traffic, drops traffic received from a network, and transmits to adjacent nodes.) Furthermore, when regenerating a cross-connect, if the device has a LCAS (Link Capacity Adjustment Scheme) function and the transmission path is configured by Virtual Concatenation, the configuration can be such that instructions are given to add Virtual Concatenation bandwidth to the LCAS control unit. In this type of configuration, the bandwidth can be changed without disturbing the traffic transmission service.

In operation S106, when registrations and updates to a USER information table are complete, the number of shares of the USER information table is incremented and if the bandwidth changes, it will be updated.

In operation S108, it is instructed for the RSVP-TE processing unit to use the shared label numbers of the search results above as label values of RSVP-TE control messages. The settings for shared labels end users can be made by means of the operations of each of the process units mentioned above. This will be described in the following. The process ends at S116.

Figure 11:
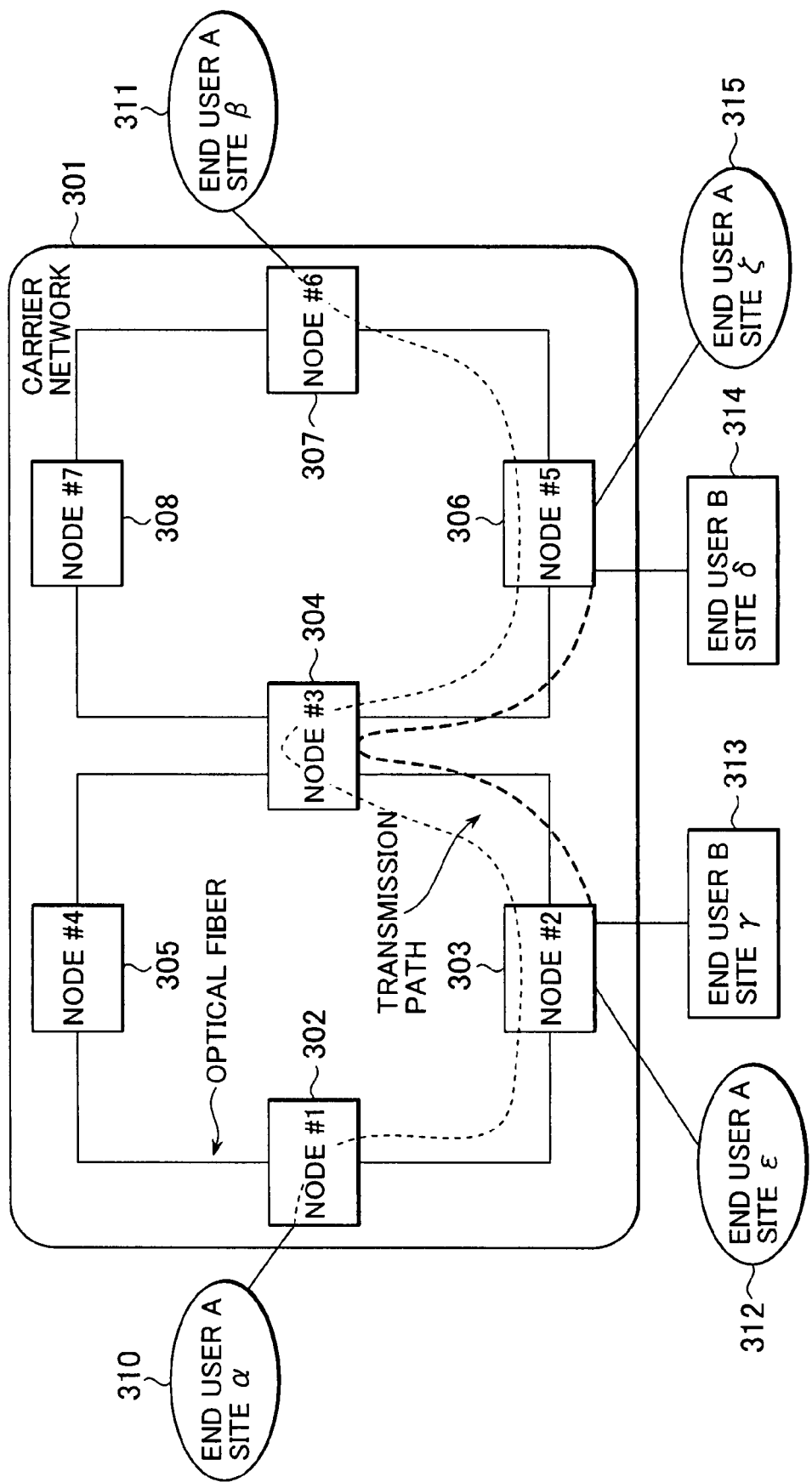
FIG. 11 is a network diagram showing a network that describes an example of path sharing.

FIG. 11 shows a virtual network. Each node is equipped with the embodiments discussed herein. FIG. 12 shows USER information of each node within the network of FIG. 11. USER information tables as shown in FIG. 12 are built for each Node 2 (303), Node 3 (304), and Node 5 (306). Sites ε and ζ of end user A share and connect the transmission path already held by the same end users for sites α and β, and statistical multiplexed traffic is transmitted.

The administrator gives instructions to Node 2, such that the Add/Drop port (temporarily 1-1) of Node 2, where site ε of end user A is connected and the Add/Drop port (temporarily 2-1) of Node 5, where site ζ is connected, are to connect a 1 Gbps in a shared state.

As the instructions are path generation instructions, the USER information processing unit of Node 2 that received the instructions examines whether or not end user A exists in the USER information table, creates an end user identifier and a USER object set to allow sharing, adds these to control packets (PATH messages), and transmits them to Node 3 (The route up to Node 5 is managed by a signaling protocol control unit and appends to a PATH message as ERO. In addition, the 1 Gbps required bandwidth is reported as a Sender Tspec object of a PATH message.).

As Node 3 that received the PATH message is not addressed to itself, a PATH message is sent as-is to Node 5 for the USER object. The USER information processing unit of Node 5 that received the PATH message starts the processing since it is a PATH message addressed to itself. A USER object is added to the PATH message establishing it as being sharable and the USER information table is examined to check whether or not the end user is registered. End user A is already registered in the USER information table of Node 5 and a shared label already exists for the link that received the PATH message (1-1). [0062] Because of this, a share confirmation message is sent to Node 3, which is the RESV message transmission destination. As Node 3 is equipped with the embodiments discussed herein, when a USER information processing unit receives a share confirmation message, the share confirmation message will be sent to Node 5. As a sharable message is received, the USER information processing unit of Node 5 is used as a shared label, and a path sharing management unit is instructed that 1 Gbps is required as the required bandwidth. The path sharing management unit that received the instruction is not instructed to generate a new label. Consequently, entries matching end user identifiers A and label numbers 1-1 passed from a USER information processing unit are located from a USER information table and 50 Mbps is extracted as the bandwidth of the applicable shared label of the link that received the PATH message.

Since the required bandwidth is not satisfied, a cross-connect is deleted once after confirming the information in the cross-connect DB and instructions are given for a cross-connect with the required bandwidth. Thereafter, the bandwidth on the East side of a USER information table is updated, the number of shares is incremented, and instructions are given to use 1-1 (shared label number) for Node 3 and then an RESV message is sent.

The USER information processing unit of Node 3 that received the RESV message performs the message processing. As a USER object is added to the received RESV message and set to be sharable, a check is made to determine whether or not an end user is registered in the USER information table. In addition, since end user A is already registered in the USER information table of Node 3 and a shared label already exists at the link that received the RESV message, this (the USER information processing unit) is used.

As a shared label already exists at the link to be sent, a share confirmation message will be sent to Node 2 (the RESV message send destination). As Node 2 is equipped with the present invention, when the USER information processing unit receives a share confirmation message, the sharable message will be sent to Node 3. Since a sharable message is received, the USER information processing unit of Node 3 uses 1-1 as a shared label and the path sharing management unit is instructed that 1 Gbps is necessary as the required bandwidth. As the path sharing management unit that received the instructions is not instructed to generate a new label, entries matching end user identifiers A and path numbers 1-1 passed from a USER information processing unit are located from a USER information table and 50 Mbps is extracted as the bandwidth of the applicable shared path of the site that received the RESV message.

Since the required bandwidth is not satisfied, a cross-connect is deleted once, and a cross-connect with the required bandwidth is newly generated. Thereafter, the USER information table is updated, the number of shares is incremented, and instructions are given to use 1-1 (shared label number) for Node 2, and then an RESV message is sent. The USER information processing unit of Node 2 that received the RESV message processes the message. As a USER object is added to the received RESV message and the message is set to be sharable, a check is made to determine whether or not an end user is registered in the USER information table.

In addition, since end user A is already registered in the USER information table of Node 2 and a shared path already exists at the link that received the RESV message, this (the USER information processing unit) is used. The USER information processing unit of Node 2 uses 1-1 as a shared label and the path sharing management unit is instructed that 1 Gbps is necessary as the required bandwidth. As the path sharing management unit that received the instructions is not instructed to generate a new label, entries matching end user identifiers A and path numbers 1-1 passed from a USER information processing unit are located from a USER information table and 50 Mbps is extracted as the bandwidth of the applicable shared path of the link that received the RESV message.

Since the required bandwidth is not satisfied, a cross-connect is deleted once and a cross-connect with the required bandwidth newly generated. Thereafter, the USER information table is updated and the number of shares is incremented.

Figure 13:
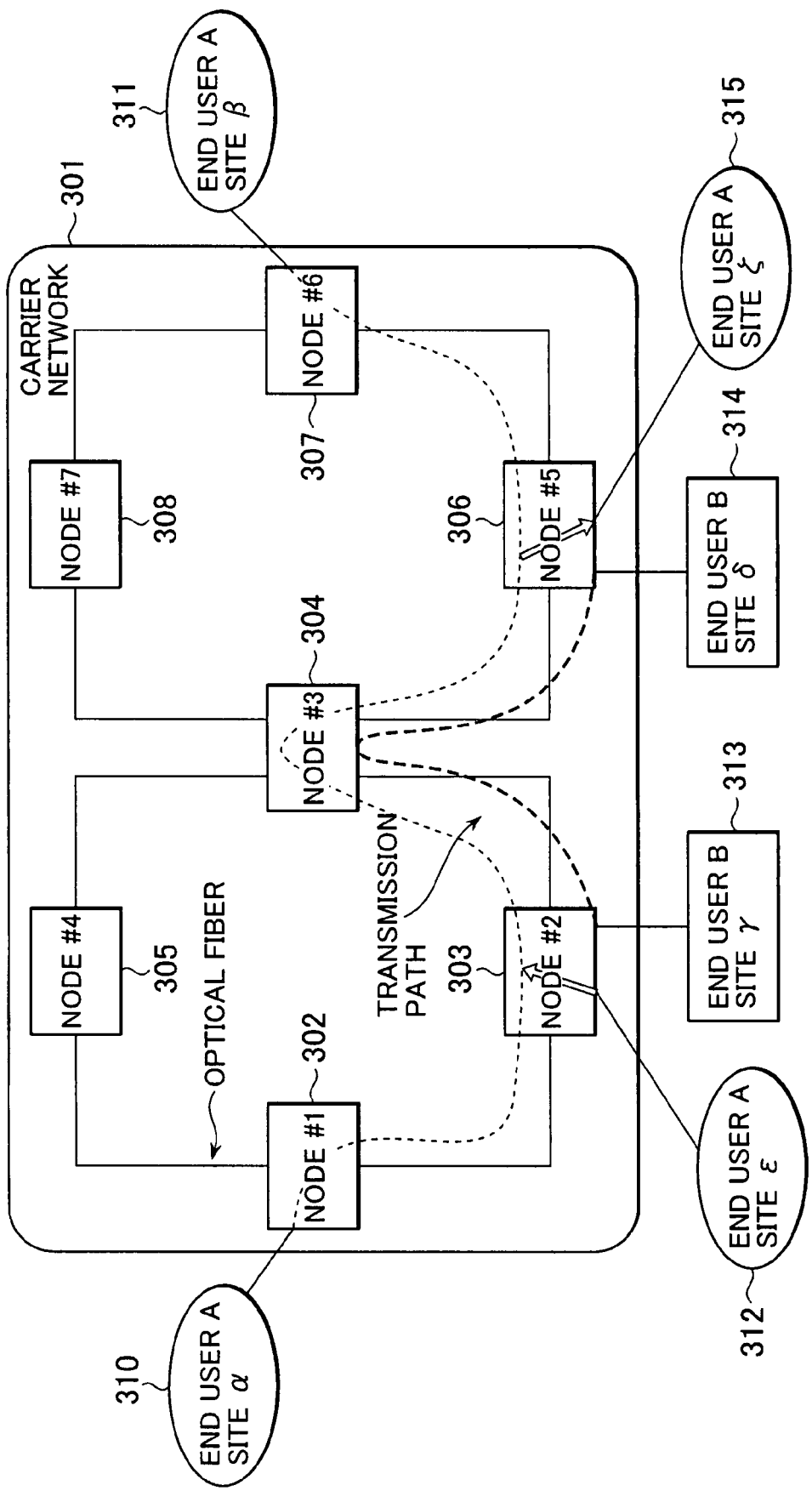
FIG. 13 is a network diagram showing a network that describes an example of path sharing (after completing shared label establishment).

FIG. 13 shows path connections within a network. This figure shows the path of end user A shared within the network. FIG. 14 shows a USER information table when sharing paths. It is understood that the path of end user A is a shared path within the network and USER A of end user identifier 142 becomes 2 at number of shares 146.

When a network is configured using a transmission device equipped with the path sharing management system of the present invention, if there is network traffic that can be statistically multiplexed, transmission paths within networks can share multiple data flows, allowing more efficient utilization of network bandwidth, compared to a conventional network, without losing the advantage of lower operating costs gained by automatically generating paths using GMPLS.

Although a few preferred embodiments have been shown and described, it would be appreciated by those skilled in the art that changes may be made in these embodiments without departing from the principles and spirit of the invention, the scope of which is defined in the claims and their equivalents.

What is claimed is:

1. A transmission device that automatically generates transmission paths within a transmission network, the transmission device comprising:
    a storage configured to store first information that indicates an end user, a link containing a transmission path associated with the end user, a path bandwidth associated with the transmission path and a label used for generating the transmission path, and second information that indicates whether the label can be shared;
    a sender configured to send third information identifying the end user and the second information to an adjacent node; and
    a signaling protocol processor that, when generating a transmission path according to a signal protocol and when an existing sharable label is found, confirms whether an existing label is sharable for adjacent nodes before establishing a cross-connect to generate a shared transmission path based on the label, and establishes another cross-connect when there is no sharable response.

2. The transmission device according to claim 1, further comprising:
    a usable bandwidth monitoring processor that stores a maximum bandwidth that can be secured for each end user and a warning threshold value which warns when the remaining bandwidth that can be allocated for each end user is low for transmission paths where each link between nodes are stored.

3. The transmission device according to claim 2, wherein the usable bandwidth monitoring processor outputs a warning message to a maintenance terminal if the allocated bandwidth is exceeded.

4. A method of automatically generating transmission paths within a transmission network, comprising:
    storing first information that indicates an end user, a link containing a transmission path associated with the end user, a path bandwidth associated with the transmission path and a label used for generating the transmission path, and second information that indicates whether the label can be shared;
    sending third information identifying the end user and the second information to an adjacent node;
    generating the transmission path according to a signal protocol;
    finding an existing sharable label;
    confirming whether an existing label is sharable for adjacent nodes; and
    establishing a cross-connect to generate a shared transmission path based on the label, and establishing another cross-connect when there is no sharable response.

5. The method according to claim 4, further comprising:
storing a maximum bandwidth that can be secured for each end user and a warning threshold value which warns when the remaining bandwidth that can be allocated for each end user is low for transmission paths where each link between nodes are stored.

6. The method according to claim 5, further comprising:
outputting a warning message if the allocated bandwidth is exceeded.

7. A method, comprising:
for a transmission path assigned to a user, storing a user link assignment, a path bandwidth, a label for generating the transmission path, and a path share indicator indicating whether the label can be shared;
sending user identification of the user and the share indicator to an adjacent node;
generating the transmission path according to a signal protocol;
finding an existing sharable label;
confirming whether an existing label is sharable for adjacent nodes; and
establishing a cross-connect to generate a shared transmission path based on the label, and establishing another cross-connect when there is no sharable response.

8. A non-transitory computer readable storage medium for controlling a computer and storing a method, comprising:
for a transmission path assigned to a user, storing a user link assignment, a path bandwidth, a label for generating the transmission path, and a path share indicator indicating whether the label can be shared;
sending user identification of the user and the share indicator to an adjacent node;
generating the transmission path according to a signal protocol;
finding an existing sharable label;
confirming whether an existing label is sharable for adjacent nodes; and
establishing a cross-connect to generate a shared transmission path based on the label, and establishing another cross-connect when there is no sharable response.

9. A non-transitory computer readable storage medium for controlling a computer and storing a data structure for transmission network path generation, the data structure comprising a table comprising:
a link identifier field for a link identifier;
a user identifier field for identifying a user of the link;
a bandwidth field for identifying a bandwidth of the path;
a label field for a label used for generating the transmission path; and
a share indicator field for identifying whether the label can be shared, wherein
when a transmission path is generated according to a signal protocol and when an existing sharable label is found in the table, it is confirmed whether an existing label is sharable for adjacent nodes before establishing a cross-connect to generate a shared transmission path based on the label, and another cross-connect is established when there is no sharable response.

* * * * *